US012643349B2

(12) United States Patent
Kawai

(10) Patent No.: US 12,643,349 B2
(45) Date of Patent: Jun. 2, 2026

(54) PNEUMATIC TIRE

(71) Applicant: SUMITOMO RUBBER INDUSTRIES, LTD., Hyogo (JP)

(72) Inventor: Hiroki Kawai, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 715 days.

(21) Appl. No.: 17/434,091

(22) PCT Filed: Feb. 6, 2020

(86) PCT No.: PCT/JP2020/004515
§ 371 (c)(1),
(2) Date: Aug. 26, 2021

(87) PCT Pub. No.: WO2020/179347
PCT Pub. Date: Sep. 10, 2020

(65) Prior Publication Data

US 2022/0134808 A1 May 5, 2022

(30) Foreign Application Priority Data

Mar. 1, 2019 (JP) ................................ 2019-037426

(51) Int. Cl.
*B60C 15/06* (2006.01)

(52) U.S. Cl.
CPC ...... *B60C 15/06* (2013.01); *B60C 2015/0614* (2013.01)

(58) Field of Classification Search
CPC ............ B60C 1/0025; B60C 2001/005; B60C 15/06
See application file for complete search history.

(56) References Cited

U.S. PATENT DOCUMENTS 5,124,408 A * 6/1992 Engels .................... C08L 21/00 525/215
7,152,647 B2 12/2006 Maruoka et al.
(Continued)

FOREIGN PATENT DOCUMENTS

EP 3202595 8/2017
GB 2085377 * 4/1982
(Continued)

OTHER PUBLICATIONS

Extended European Search Report issued in Corresponding EP Patent Application No. 20765834.5, dated Sep. 27, 2022.
(Continued)

*Primary Examiner* — Justin R Fischer
(74) *Attorney, Agent, or Firm* — Greenblum & Bernstein, P.L.C.

(57) ABSTRACT

Provided is a pneumatic tire with which the same driving safety as prior arts can be ensured and an improvement in fuel efficiency performance and durability performance is achieved. In this pneumatic tire, the tire radial direction outside end section of a chafer is disposed on the tire surface part, the loss tangent tan δ70° C.–SW of a side wall, the loss tangent tan δ70° C.–C of the chafer, complex elastic modulus E*70° C.–SW of the side wall, and the complex elastic modulus E*70° C.–C of the chafer under the condition of 70° C., an elongation of 1%, and a frequency of 10 Hz, and the loss tangent tan δ150° C.–SW of the side wall, and the loss tangent tan δ150° C.–C of the chafer measured under the condition of 150° C., an elongation of 1%, a frequency of 10 Hz satisfy the following expression. tan δ70° C.–SW+tan δ70° C.–C≤0.25|tan δ70° C.–SW−tan δ70° C.–C|≤0.07 E*70° C.–C−E*70° C.–SW≤6.5 MPa tan δ150° C.–SW+tan δ150° C.–C≤0.20.

9 Claims, 3 Drawing Sheets

(56) References Cited

U.S. PATENT DOCUMENTS

| | | | | |
|---|---|---|---|---|
| 2004/0025998 | A1 | 2/2004 | Close | |
| 2007/0144658 | A1 | 6/2007 | Miki et al. | |
| 2010/0032071 | A1 | 2/2010 | Ki | |
| 2011/0071253 | A1* | 3/2011 | Hochi | C08K 5/36 525/352 |
| 2013/0133806 | A1 | 5/2013 | Amano et al. | |
| 2014/0000780 | A1 | 1/2014 | Brunea et al. | |
| 2015/0367685 | A1 | 12/2015 | Takahashi | |
| 2018/0126800 | A1* | 5/2018 | Tanada | B60C 15/024 |

FOREIGN PATENT DOCUMENTS

| | | | |
|---|---|---|---|
| JP | 2008273519 | * | 11/2008 |
| JP | 2010-058782 | A | 3/2010 |
| JP | 2010-115958 | A | 5/2010 |
| JP | 4891613 | | 3/2012 |
| JP | 2013-141963 | A | 7/2013 |
| JP | 2013-241043 | A | 12/2013 |
| JP | 2013-545671 | A | 12/2013 |
| JP | 2015-199465 | A | 11/2015 |
| JP | 2018-075942 | A | 5/2018 |
| WO | 2012/018106 | A1 | 2/2012 |
| WO | 2014/122953 | | 8/2014 |

OTHER PUBLICATIONS

Office Action issued in Corresponding CN Patent Application No. 202080018230.4, dated Feb. 10, 2023, along with an English translation and brief explanation thereof.

Office Action issued in Corresponding JP Patent Application No. 2021-503479, dated Jun. 8, 2023, along with a brief explanation and English translation thereof.

* cited by examiner

[Fig. 1]
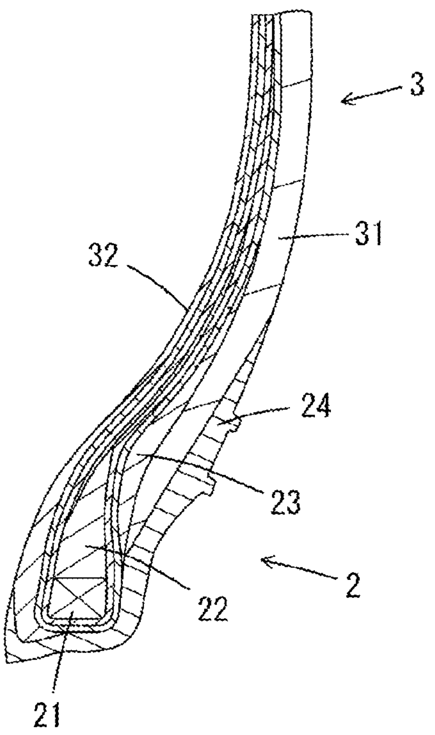

[Fig. 2]
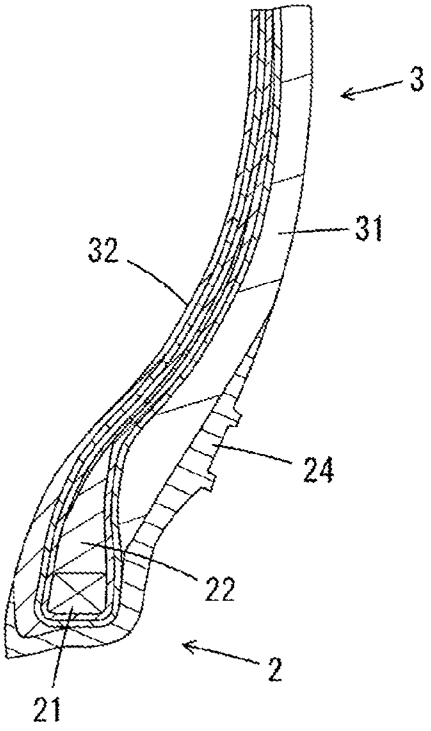

[Fig. 3]
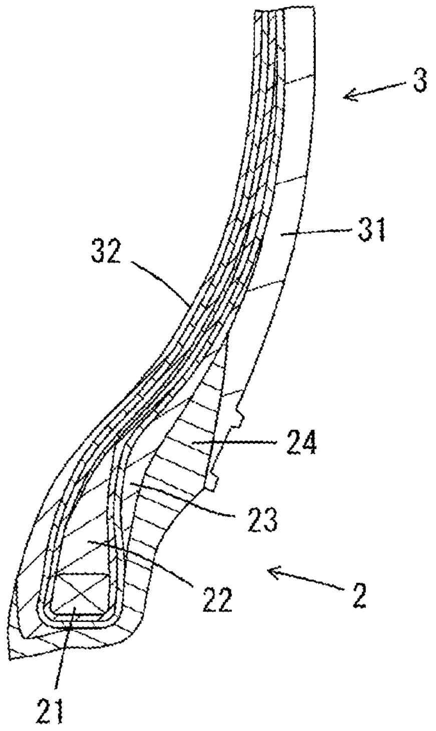

PNEUMATIC TIRE

TECHNICAL FIELD

The present invention relates to a pneumatic tire, more specifically, a pneumatic tire having excellent fuel efficiency and durability.

BACKGROUND ART

In recent years, there has been an increasing demand for improved steering stability, vehicle weight reduction, and rolling resistance related to fuel efficiency and durability of pneumatic tires (hereinafter, also simply referred to as "tires").

Under such circumstances, tires having a structure in which the bead apex is made smaller, and the bead reinforcing filler is externally attached to the case to form the bead portion schematically shown in FIG. 3, thereby ensuring the steering stability, and the like, have been proposed. (see, for example, Patent Documents 1 and 2). In FIG. 3, 2 is a bead portion, and 3 is a sidewall portion. Further, 21 is a bead core, 22 is a bead apex, 23 is a bead reinforcing filler, 24 is a chafer, 31 is a sidewall, and 32 is a carcass ply.

PRIOR ART DOCUMENTS

Patent Document

[Patent Document 1] JP2013-545671A
[Patent Document 2] WO2012/18106

SUMMARY OF INVENTION

Problem to be Solved by the Invention

However, in the case of a tire having a conventional structure having a bead portion 2 shown in FIG. 3, although steering stability can be ensured, the bead portion 2 is deformed around the tip of the bead apex 22 during running. As a result, heat is likely to be generated in the bead portion 2, particularly the chafer 24. The heat generated in such a bead portion has a large influence on the durability performance and rolling resistance of the tire, and is a problem from the viewpoint of further improving the fuel efficiency performance.

Therefore, it is an object of the present invention to provide a pneumatic tire which can secure the same steering stability as the conventional one and has improved fuel efficiency and durability.

Means for Solving the Problem

The present inventor has conducted diligent studies and found that the above-mentioned problems can be solved by the invention described below, and has completed the present invention.

The invention according to claim 1 is a pneumatic tire having a bead apex, a bead reinforcing filler, a sidewall and a chafer in the bead portion, or having a bead apex, a sidewall and a chafer in the bead portion, in which the outer end of the chafer in the tire radial direction is located on the tire surface, and, which is characterized in that, when the loss tangents of the sidewall and the chafer measured under the conditions of 70° C., 1% elongation and frequency of 10 Hz are set to $\tan\delta 70°\ C._{-SW}$ and $\tan\delta 70°\ C._{-C}$, respectively, the complex elastic moduli of the sidewall and the chafer measured under the same conditions are set to $E^*70°\ C._{-SW}$ (MPa) and $E^*70°\ C._{-C}$ (MPa), respectively, and the loss tangents of the sidewall and the chafer measured under the conditions of 150° C., 1% elongation and frequency of 10 Hz are set to $\tan\delta 150°\ C._{-SW}$ and $\tan\delta 150°\ C._{-C}$, respectively, the following formula are satisfied.

$$\tan\delta 70°\ C._{-SW}+\tan\delta 70°\ C._{-C}\leq 0.25$$

$$|\tan\delta 70°\ C._{-SW}-\tan\delta 70°\ C._{-C}|\leq 0.07$$

$$E^*70°\ C._{-C}-E^*70°\ C._{-SW}\leq 6.5\text{ MPa}$$

$$\tan\delta 150°\ C._{-SW}+\tan\delta 150°\ C._{-C}\leq 0.20$$

The invention according to claim 2 is the pneumatic tire according to claim 1, wherein the sidewall and the chafer satisfy the following formula.

$$\tan\delta 70°\ C._{-SW}+\tan\delta 70°\ C._{-C}\leq 0.20$$

$$|\tan\delta 70°\ C._{-SW}-\tan\delta 70°\ C._{-C}|\leq 0.05$$

$$E^*70°\ C._{-C}-E^*70°\ C._{-SW}\leq 6.0\text{ MPa}$$

$$\tan\delta 150°\ C._{-SW}+\tan\delta 150°\ C._{-C}\leq 0.15$$

The invention according to claim 3 is the pneumatic tire according to claim 2, wherein the sidewall and the chafer satisfy the following formula.

$$\tan\delta 70°\ C._{-SW}+\tan\delta 70°\ C._{-C}\leq 0.17$$

$$|\tan\delta 70°\ C._{-SW}-\tan\delta 70°\ C._{-C}|\leq 0.04$$

$$E^*70°\ C._{-C}-E^*70°\ C._{-SW}\leq 5.5\text{ MPa}$$

$$\tan\delta 150°\ C._{-SW}+\tan\delta 150°\ C._{-C}0.12$$

The invention according to claim 4 is the pneumatic tire according to claim 3, wherein the sidewall and the chafer satisfy the following formula.

$$\tan\delta 70°\ C._{-SW}+\tan\delta 70°\ C._{-C}\leq 0.15$$

$$|\tan\delta 70°\ C._{-SW}-\tan\delta 70°\ C._{-C}|\leq 0.03$$

$$E^*70°\ C._{-C}-E^*70°\ C._{-SW}\leq 5.0\text{ MPa}$$

$$\tan\delta 150°\ C._{-SW}+\tan\delta 150°\ C._{-C}\leq 0.10$$

The invention according to claim 5 is the pneumatic tire according to claim 1, wherein the sidewall and the chafer satisfy the following formula.

$$\tan\delta 70°\ C._{-SW}+\tan\delta 70°\ C._{-C}\leq 0.22$$

The invention according to claim 6 is the pneumatic tire according to claim 1, wherein the sidewall and the chafer satisfy the following formula.

$$|\tan\delta 70°\ C._{-SW}-\tan\delta 70°\ C._{-C}|\leq 0.06$$

The invention according to claim 7 is the pneumatic tire according to claim 1, wherein the sidewall and the chafer satisfy the following formula.

$$E^*70°\ C._{-C}-E^*70°\ C._{-SW}\leq 4.0\text{ MPa}$$

The invention according to claim 8 is the pneumatic tire according to claim 1, wherein the sidewall and the chafer satisfy the following formula.

$$\tan\delta 150°\ C._{-SW}+\tan\delta 150°\ C._{-C}\leq 0.17$$

The invention according to claim 9 is the pneumatic tire according to any one of claims 1 to 8, wherein the tire is a passenger car tire.

The invention according to claim 10 is the pneumatic tire according to any one of claims 1 to 9, which is at least one selected from a group consisting of a tire with a sound absorbing member, a tire with a sealing member and a tire with an electronic component.

The Effect of the Invention

According to the present invention, it is possible to provide a pneumatic tire which can ensure the same steering stability as the conventional one and has improved fuel efficiency and durability.

BRIEF DESCRIPTION OF THE DRAWINGS

FIG. 1 A schematic cross-sectional view showing the structure of the bead part of the pneumatic tire of this invention according to the first embodiment.

FIG. 2 A schematic cross-sectional view showing the structure of the bead part of the pneumatic tire of this invention according to the second embodiment.

FIG. 3 A schematic cross-sectional view showing the structure of the bead part of the conventional pneumatic tire.

EMBODIMENTS FOR CARRYING OUT THE INVENTION

[1] Basic Concept of the Present Invention

As a result of diligent studies on solving the above-mentioned problems, it was found that the same steering stability as the conventional one can be ensured and the fuel efficiency performance and durability performance can be improved when a method of arranging each member in the bead portion is devised and the heat generation and rigidity of each member are controlled appropriately. Thus, the present invention has been completed.

That is, when the bead portion is configured by arranging the outer end portion of the chafer in the tire radial direction on the tire surface portion, excessive deformation in the bead portion can be suppressed (the first feature).

In addition, it becomes possible to suppress local deformation and damage due to heat generation in the bead portion when, by devising the respective formulations of the sidewalls and chafers that are adjacent members of the bead portion, the heat generation in each is appropriately controlled to reduce the heat generation in the bead portion, and the mutual rigidity and heat generation are controlled appropriately to reduce their differences (second feature).

As a result, it is possible to ensure the same steering stability as prior arts, and to improve fuel efficiency and durability.

[2] Embodiment of the Present Invention

Hereinafter, the embodiment of the present invention will be specifically described in the order of the first feature and the second feature described above.

1. First Feature (Arrangement of Chafer)

As described above, in the bead portion of the present embodiment, the outer end portion of the chafer in the tire radial direction is arranged on the tire surface portion. Since the following two types of bead portions are possible in the present invention, they will be described separately.

That is, the bead portion of the first embodiment having the bead apex, the bead reinforcing filler, the chafer and the sidewall, and the bead portion of the second embodiment having the bead apex, the sidewall and the chafer.

(1) First Embodiment

In the first embodiment, the bead portion has a bead apex, a bead reinforcing filler, a chafer and a sidewall as described above. FIG. 1 is a schematic cross-sectional view showing the structure of a bead portion in the pneumatic tire according to the first embodiment.

In FIG. 1, each reference numeral is the same as in FIG. 3, where 2 is a bead portion and 3 is a sidewall portion. Further, 21 is a bead core, 22 is a bead apex, 23 is a bead reinforcing filler, 24 is a chafer, 31 is a sidewall and 32 is a carcass ply.

As shown in FIG. 1, in the case of the first embodiment, in addition to the bead reinforcing filler 23 being externally attached to the case, the outer end portion of the chafer 24 in the tire radial direction is arranged on the outer side of the sidewall 31, that is, arranged on the tire surface. As a result, in addition to ensuring steering stability, it is possible to suppress the occurrence of excessive deformation in the bead portion 2 and suppress the generation of heat generation in the bead portion 2, particularly the chafer 24, and, by reducing the influence on durability performance and rolling resistance of the tire, the fuel efficiency cab be further improved.

(2) Second Embodiment

In the second embodiment, the bead portion has a bead apex, a sidewall and a chafer as described above. FIG. 2 is a schematic cross-sectional view showing the structure of the bead portion of the tire according to the second embodiment. This embodiment is different from the first embodiment in that the bead reinforcing filler is not arranged. In FIG. 2, each reference numeral is the same as in FIGS. 1 and 3.

However, in the second embodiment, the same as in the first embodiment, the outer end portion of the chafer 24 in the tire radial direction is arranged on the outer side of the sidewall 31, that is, on the tire surface portion. Therefore, also in the second embodiment, in addition to ensuring steering stability, the occurrence of excessive deformation in the bead portion 2 is suppressed, and the generation of heat generation in the bead portion 2, particularly in the chafer 24 is suppressed. Thus, the influence on the durability performance and rolling resistance of the tire are reduced, and the fuel efficiency performance can be improved further.

2. Second Feature (Rubber Properties of Sidewall and Chafer)

Next, the rubber properties (heat generation and rigidity) of the sidewall and chafer, which are the second features, will be described.

(1) Loss Tangent Tan δ

First, the loss tangent tan δ, which is an index related to heat generation, will be described. As described above, in the present embodiment, the heat generation in the sidewall and the chafer is appropriately controlled to reduce the difference, thereby suppressing local deformation in the bead portion and damage due to heat generation.

Specifically, when the loss tangents of the sidewall and the chafer measured under the conditions of 70° C., 1% elongation and frequency of 10 Hz were set to tan δ70° C.$_{-SW}$ and tan δ70° C.$_{-C}$, respectively, the following formula are satisfied.

$$\tan\delta70°\ C._{-SW}+\tan\delta70°\ C._{-C}\le 0.25$$

$$|\tan\delta70°\ C._{-SW}-\tan\delta70°\ C._{-C}|\le 0.07$$

In the above formula, tan δ70° C.$_{-SW}$+tan δ70° C.$_{-C}$ is preferably 0.22 or less, and |tan δ70° C.$_{-SW}$−tan δ70° C.$_{-C}$| is preferably 0.06 or less.

In this way, at 70° C., which is the temperature of the tire during normal running, the heat generation in the bead portion can be reduced by controlling the sum of the loss tangents of the adjacent sidewalls and chafers in the bead portion to be as small as 0.25 or less, preferably 0.22 or less. Further, by controlling the difference between the loss tangent in the sidewall and the chafer to be as small as 0.07 or less, preferably 0.06 or less in absolute value, local deformation in the bead portion and damage due to heat generation can be suppressed.

It is more preferable that the sum and difference of the loss tangents of the sidewall and the chafer at 70° C. satisfy the following formula.

$$\tan\delta70°\ C._{-SW}+\tan\delta70°\ C._{-C}\le 0.20$$

$$|\tan\delta70°\ C._{-SW}-\tan\delta70°\ C._{-C}|\le 0.05$$

Further, it is more preferable that the following formula is satisfied.

$$\tan\delta70°\ C._{-SW}+\tan\delta70°\ C._{-C}\le 0.17$$

$$|\tan\delta70°\ C._{-SW}-\tan\delta70°\ C._{-C}|\le 0.04$$

And it is particularly preferable that the following formula is satisfied.

$$\tan\delta70°\ C._{-SW}+\tan\delta70°\ C._{-C}\le 0.15$$

$$|\tan\delta70°\ C._{-SW}-\tan\delta70°\ C._{-C}|\le 0.03$$

It is expected that the tire temperature will rise further during high-speed driving. Therefore, in the present embodiment, the sum of the loss tangents of the sidewall and the chafer at 150° C. is further controlled to 0.20 or less. That is, when the loss tangents of the sidewall and the chafer measured under the conditions of 150° C., 1% elongation and frequency 10 Hz are to set tan δ150° C.$_{-SW}$ and tan δ150° C.$_{-C}$, respectively, the following formula is to be satisfied.

$$\tan\delta150°\ C._{-SW}+\tan\delta150°\ C._{-C}\le 0.20$$

In the above formula, tan δ150° C.$_{-SW}$+tan δ150° C.$_{-C}$ is preferably 0.17 or less.

In this way, at 150° C., which is the temperature of the tire during high-speed running, the sum of the loss tangents of the sidewall and the chafer is 0.20 or less, preferably 0.17 or less, which is smaller than that at 70° C. As a result, the heat generation in the bead portion during high-speed running can be sufficiently reduced.

The sum of the loss tangents of the sidewall and the chafer at 150° C. is more preferably 0.15 or less, further preferably 0.12 or less, and particularly preferably 0.10 or less.

(2) Complex Elastic Modulus E*

Next, the complex elastic modulus E*, which is an index related to rigidity, will be described. As described above, in the present embodiment, the rigidity of the sidewall and the chafer is appropriately controlled to reduce the difference, thereby suppressing local deformation of the bead portion and damage due to heat generation.

Specifically, the complex elastic moduli of the sidewall and the chafer measured under the conditions of 70° C., 1% elongation and frequency of 10 Hz are set to E*70° C.$_{-SW}$ (MPa) and E*70° C.$_{-C}$ (MPa), respectively, the following formula is satisfied.

$$E^*70°\ C._{-C}-E^*70°\ C._{-SW}\le 6.5\ \text{MPa}$$

In this way, regarding the complex elastic modulus in the sidewall and the chafer adjacent to each other in the bead portion, the complex elastic modulus in the chafer is made larger than the complex elastic modulus in the sidewall, but the difference is controlled to be as small as 6.5 MPa or less, thereby, local deformation in the bead portion and damage due to heat generation can be suppressed.

The difference in complex elastic modulus described above is preferably 6.0 MPa or less, more preferably 5.5 MPa or less, further preferably 5.0 MPa or less, and particularly preferably 4.0 MPa or less.

3. Rubber Composition for the Present Embodiment

The sidewall and chafer having the above-mentioned rubber properties are formed by the rubber composition described below. The bead apex and the bead reinforcing filler are formed by the same rubber composition as that for the conventional one.

(1) Rubber Composition for Sidewall and Rubber Composition for Chafer

The rubber composition for sidewall and rubber composition for chafer in the present embodiment contain a rubber component such as natural rubber (NR) and butadiene rubber (BR). For another embodiment, a resin composition may be used.

The NR is not particularly limited, and those normally used in the rubber industry can be used. Specific examples thereof include RSS #3 and TSR20.

The content of NR in the rubber component is preferably 20% by mass or more, more preferably 25% by mass or more, further more preferably 30% by mass or more, from the viewpoint of excellent breaking strength and excellent workability. Further, the content of NR in the rubber component is preferably 70% by mass or less, more preferably 65% by mass or less, further more preferably 60% by mass or less from the viewpoint of excellent crack growth resistance and improving hardness.

Examples of BR include ordinary BR, butadiene rubber having a high cis content (high cis BR), modified butadiene rubber (modified BR), and butadiene rubber containing 1,2-syndiotactic polybutadiene crystals (SPB-containing BR). Two or more types may be used in combination.

The content of BR in the diene-based rubber component is preferably 20% by mass or more, more preferably 30% by mass or more, further more preferably 40% by mass or more from the viewpoint of improving crack growth resistance. Further, the content of BR in the diene-based rubber component is preferably 85% by mass or less, more preferably 80% by mass or less, further more preferably 70% by mass or less from the viewpoints that zinc oxide can be sufficiently dispersed, the flatness of the sheet fabric is excellent, and the non-perforated property is excellent.

The high cis BR in BR means a BR having a cis 1,4-bond content of 90% or more with respect to the butadiene portion of the obtained rubber. As the high cis BR, a commercially available high cis BR can be used. For example, a butadiene rubber having a high cis content (high cis BR), such as BR130B and BR150B manufactured by Ube Industries, Ltd. can be preferably used.

Examples of the modified BR include Sn coupling+terminal modified BR. As such a modified BR, a commercially available modified BR can be used. For example, BR1250H manufactured by Zeon Corporation can be preferably used.

As for the SPB-containing BR in BR, it is preferable that 1,2-syndiotactic polybutadiene crystals are dispersed after being chemically bonded to BR, not simply dispersed in BR. The generation and propagation of cracks tend to be suppressed when the 1,2-syndiotactic polybutadiene crystals are chemically bonded to the rubber component and then dispersed.

Further, since the 1,2-syndiotactic polybutadiene crystal contained in BR has sufficient hardness, a sufficient complex elastic modulus can be obtained even if the crosslink density is low.

The melting point of the 1,2-syndiotactic polybutadiene crystal is preferably 180° C. or higher, more preferably 190° C. or higher. When the melting point is lower than 180° C., the crystals tend to melt during vulcanization of the tire in the press and the hardness tends to decrease. The melting point of the 1,2-syndiotactic polybutadiene crystal is preferably 220° C. or lower, more preferably 210° C. or lower. When the melting point is higher than 220° C., the molecular weight of BR increases, so that the dispersibility in the rubber composition tends to deteriorate.

In the SPB-containing BR, the content of the boiling n-hexane insoluble matter is preferably 2.5% by mass or more, and more preferably 8% by mass or more. When the content is less than 2.5% by mass, the rubber composition tends not to have sufficient hardness. The content of the boiling n-hexane insoluble matter is preferably 22% by mass or less, more preferably 20% by mass or less, further preferably 18% by mass or less. When the content exceeds 22% by mass, the viscosity of BR itself is high, and the dispersibility of BR and the filler in the rubber composition tends to be deteriorated. Here, the boiling n-hexane insoluble matter refers to 1,2-syndiotactic polybutadiene in the SPB-containing BR.

In the SPB-containing BR, the content of 1,2-syndiotactic polybutadiene crystals is preferably 2.5% by mass or more, more preferably 10% by mass or more. When the content is less than 2.5% by mass, the hardness may be insufficient. The content of 1,2-syndiotactic polybutadiene crystals in BR is preferably 20% by mass or less, more preferably 18% by mass or less. When the content exceeds 20% by mass, BR is difficult to disperse in the rubber composition, and workability may be deteriorated.

Further, in order to improve the hardness (Hs), reversion property and weather resistance of the rubber composition, styrene-butadiene rubber (SBR), butyl rubber (IIR) or ethylene-propylene-diene terpolymer rubber (EPDM) may be further contained, as a diene-based rubber component.

When SBR, IIR or EPDM is contained, the content thereof is preferably 10% by mass or more, more preferably 15% by mass or more, further more preferably 20% by mass or more, based on 100 parts by mass of the diene-based rubber from the viewpoint that the effects of hardness (Hs), reversion property and weather resistance of the rubber composition are exhibited. The content of SBR, IIR or EPDM is preferably 40% by mass or less, more preferably 35% by mass or less, further more preferably 30% by mass, based on 100 parts by mass of the diene-based rubber, from the viewpoint of excellent breaking strength and workability.

In the present embodiment, the rubber composition for sidewalls and the rubber composition for chafers contain, for example, silica or carbon black as a reinforcing filler.

The content of carbon black is preferably 5 parts by mass or more, more preferably 7 parts by mass, further preferably 15 parts by mass or more based on 100 parts by mass of the diene-based rubber component, from the viewpoint that sufficient hardness can be obtained and weather resistance such as ultraviolet absorption and ozone absorption is excellent. Further, the content of carbon black is preferably 90 parts by mass or less, more preferably 80 parts by mass or less, further more preferably 70 parts by mass or less based on 100 parts by mass of the diene-based rubber component, from the viewpoint that sufficient breaking strength can be obtained and excellent in low heat generation.

The nitrogen adsorption specific surface area ($N_2SA$) of carbon black is preferably 25 to 200 $m^2/g$. As the carbon black, for example, carbon blacks such as N220, N330, N351, N550 and N660 can be used. Among these, N550 is preferably used for the sidewall rubber composition and N330T is preferably used for the chafer rubber composition.

The silica is not particularly limited, and examples thereof include dry silica (silicic anhydride) and wet silica (silicic anhydride), and wet silica is preferable because it has a large number of silanol groups.

When silica is contained, the content thereof is preferably 5 parts by mass or more, more preferably 7 parts by mass or more, further more preferably 9 parts by mass or more based on 100 parts by mass of the diene-based rubber component from the viewpoint of improving breaking strength and low heat generation. Further, the content of silica is preferably 90 parts by mass or less, more preferably 80 parts by mass or less, further more preferably 70 parts by mass or less based on 100 parts by mass of the diene-based rubber component, from the viewpoint that sufficient breaking strength can be obtained and excellent in low heat generation.

The $N_2SA$ of silica is preferably 40 $m^2/g$ or more, more preferably 45 $m^2/g$ or more, from the viewpoint that the breaking strength of the rubber composition is improved. Further, $N_2SA$ of silica is preferably 250 $m^2/g$ or less, more preferably 200 $m^2/g$ or less, from the viewpoint of improving low heat generation.

Generally, when silica is further used as the filler, a silane coupling agent is blended together with silica. As the silane coupling agent, ordinary ones can be used.

In the present embodiment, in addition to the above-mentioned rubber component and reinforcing filler such as silica and carbon black, a compounding agent generally used for producing a rubber composition, such as zinc oxide, an anti-aging agent, a fatty acid, oil, sulfur, vulcanization accelerators, cross-linking agents and the like can be contained as required in commonly used amounts.

Zinc oxide known conventionally can be used as the zinc oxide. For example, products of Mitsui Metal Mining Co., Ltd., Toho Zinc Co., Ltd., HakusuiTech Co., Ltd., Shodo Chemical Industry Co., Ltd., Sakai Chemical Industry Co., Ltd., etc. can be used.

The content of zinc oxide is preferably 0.5 parts by mass or more, and more preferably 1 part by mass or more based on 100 parts by mass of the rubber component. The content is preferably 20 parts by mass or less, more preferably 10 parts by mass or less.

The anti-aging agent is not particularly limited, and examples thereof include naphthylamine-based anti-aging agents such as phenyl-α-naphthylamine;

diphenylamine-based anti-aging agents such as octylated diphenylamine and 4,4'-bis (α, α'-dimethylbenzyl) diphenylamine;

p-phenylenediamine-based anti-aging agents such as N-isopropyl-N'-phenyl-p-phenylenediamine, N-(1,3- dimethylbutyl)-N-phenyl-p-phenylenediamine, N, N'-di-2-naphthyl-p-phenylenediamine;

quinoline-based anti-aging agents such as polymers of 2,2,4-trimethyl-1,2-dihydroquinolin;

monophenol-based anti-aging agents such as 2,6-di-t-butyl-4-methylphenol and styrylated phenol; and bis, tris, polyphenolic anti-aging agents such as tetrakis-[methylene-3-(3',5'-di-t-butyl-4'-hydroxyphenyl) propionate]methane. As commercially available products, products of Seiko Chemical Co., Ltd., Sumitomo Chemical Co., Ltd., Ouchi Shinko Chemical Industry Co., Ltd., Flexis Co., Ltd., etc. can be used. These may be used alone or in combination of two or more.

The content of the anti-aging agent is preferably 0.3 parts by mass or more, more preferably 1 part by mass or more based on 100 parts by mass of the rubber component. Further, it is preferably 20 parts by mass or less, more preferably 15 parts by mass or less, further preferably 10 parts by mass or less.

As the fatty acid, stearic acid can be used. For example, products of NOF Corporation, NOF Corporation, Kao Corporation, Fujifilm Wako Pure Chemical Industries, Ltd., and Chiba Fatty Acid Co., Ltd. can be used.

The content of fatty acid is preferably 0.5 parts by mass or more, more preferably 1 part by mass or more based on 100 parts by mass of the rubber component. The content is preferably 20 parts by mass or less, more preferably 10 parts by mass or less.

Examples of the oil include process oils such as paraffin-based, aroma-based, and naphthenic-based process oils.

Examples of sulfur (sulfur vulcanizer) include powdered sulfur, precipitated sulfur, colloidal sulfur, insoluble sulfur, highly dispersible sulfur and soluble sulfur, which are generally used in the rubber industry. As commercially available products, products of Tsurumi Chemical Industry Co., Ltd., Karuizawa Sulfur Co., Ltd., Shikoku Chemicals Corporation, Flexis Co., Ltd., Nippon Kanryu Industry Co., Ltd., Hosoi Chemical Industry Co., Ltd., etc. can be used. These may be used alone or in combination of two or more.

The content of sulfur (sulfur vulcanizer) with respect to 100 parts by mass of the rubber component is preferably 0.3 parts by mass or more, more preferably 0.5 parts by mass or more, further preferably 1.0 part by mass or more. Further, it is preferably 20 parts by mass or less, more preferably 10 parts by mass or less.

Examples of the vulcanization accelerator include thiazole-based vulcanization accelerators such as 2-mercaptobenzothiazole, di-2-benzothiazolyl disulfide (DM (2,2'-dibenzothiazolyl disulfide)) and N-cyclohexyl-2-benzothiazyl sulfenamide;

thiuram-based vulcanization accelerators such as tetramethylthiuram disulfide (TMTD), tetrabenzyltiuram disulfide (TBzTD) and tetrakis(2-ethylhexyl) thiuram disulfide (TOT-N);

sulfenamide-based vulcanization accelerators such as N-cyclohexyl-2-benzothiazolesulfenamide, N-t-butyl-2-benzothiazolylsulfenamide, N-oxyethylene-2-benzothiazolesulfenamide, N-oxyethylene-2-benzothiazolesulfenamide amide and N,N'-diisopropyl-2-benzothiazolesulfenamide; and guanidine-based vulcanization accelerators such as diphenylguanidine, diortotrilguanidine and orthotrilbiguanidine. These may be used alone or in combination of two or more.

The content of the vulcanization accelerator is preferably 0.5 parts by mass or more, more preferably 1.0 part by mass or more based on 100 parts by mass of the rubber component, from the viewpoint of vulcanization characteristics and the like. The content is preferably 20 parts by mass or less, more preferably 10 parts by mass or less.

As the cross-linking agent, for example, a hybrid cross-linking agent such as 1,6-bis(N,N-dibenzylthiocarbamoyldithio)hexane represented by the following chemical formula is used. Specifically, Vulcuren (trade name) manufactured by Lanxess can be mentioned.

[Formula 1]

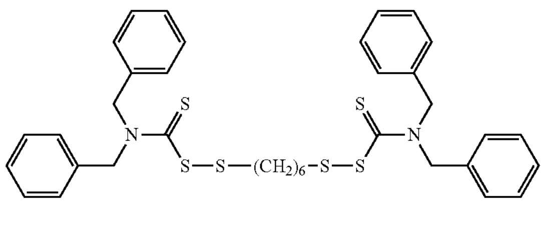

(2) Rubber Composition for Bead Apex and Rubber Composition for Bead Reinforcing Filler Next, the rubber composition for bead apex and the rubber composition for bead reinforcing filler in the present embodiment will be described. For these, the same rubber composition as that used conventionally can be used.

Examples of the rubber component of the rubber composition of the bead apex rubber composition and the bead reinforcing filler rubber composition include diene rubbers such as natural rubber (NR), isoprene rubber (IR), butadiene rubber (BR), and styrene butadiene rubber (SBR), acrylonitrile butadiene rubber (NBR), chloroprene rubber (CR) and butyl rubber (IIR). Among them, NR, IR, BR, and SBR are preferable, and combined use of NR, BR and SBR, and combined use of NR, IR and SBR are more preferable, from the view point that steering stability, fuel efficiency and extrusion workability can be satisfactorily improved.

The BR is not particularly limited, and for example, a BR having a high cis content, a BR containing syndiotactic polybutadiene crystals (SPB-containing BR), and the like can be used. Among them, SPB-containing BR is preferable from the viewpoint that the extrusion processability can be greatly improved by the inherent oriented crystal component.

When the SPB-containing BR is used, the content of SPB in the SPB-containing BR is preferably 15 to 40 parts by mass, more preferably 20 to 30 parts by mass in 100 parts by mass of the rubber component. By setting the content of SPB in the SPB-containing BR within the above range, extrusion processability can be ensured. In addition, the E* of the rubber composition can be increased. The SPB content in the SPB-containing BR is indicated by the content of boiling n-hexane insoluble matter.

The content of BR is preferably 70 parts by mass or less, more preferably 50 parts by mass or less in 100 parts by mass of the rubber component. By setting the BR content within the above range, sufficient durability can be ensured, and further sufficient extrusion processability and elongation at break can be ensured.

The SBR is not particularly limited. For example, emulsion-polymerized styrene-butadiene rubber (E-SBR), solution-polymerized styrene-butadiene rubber (S-SBR), and the like can be used. Among them, E-SBR is preferable from the viewpoint that carbon black can be dispersed well and the workability is good.

The styrene content in the SBR is preferably 10 to 40 wt %, more preferably 20 to 30 wt %. By setting the styrene content within the above range, sufficient hardness and low fuel consumption can be ensured.

The content of SBR is preferably 15 to 60 parts by mass, more preferably 25 to 40 parts by mass in 100 parts by mass of the rubber component. By setting the SBR content within the above range, sufficient extrusion workability can be ensured, and sufficient hardness and fuel efficiency can be ensured.

The content of NR is preferably 20 to 80 parts by mass, more preferably 40 to 60 parts by mass in 100 parts by mass of the rubber component. By setting the NR content within the above range, sufficient breaking strength and sufficient hardness can be ensured.

The IR content is preferably 5 to 50 parts by mass, more preferably 15 to 30 parts by mass in 100 parts by mass of the rubber component. By setting the IR content within the above range, workability can be improved and sufficient elongation at break can be ensured.

In the present embodiment, it is preferable to blend carbon black as a reinforcing material. Examples of carbon black include GPF, HAF, ISAF, SAF, FF and FEF. One of these may be used alone, or two or more thereof may be used in combination. Among these, from the viewpoint of achieving both extrusion processability and required hardness, the combined use of soft carbon-based FEF and hard carbon-based ISAF, SAF or HAF is preferable, and the combined use of ISAF and FEF is more preferable.

The content of carbon black is preferably 30 to 70 parts by mass, more preferably 45 to 65 parts by mass based on 100 parts by mass of the rubber component.

Further, from the viewpoint of extrusion processability, the carbon black preferably contains carbon black having an adsorption specific surface area of cetyltrimethylammonium bromide (CTAB) of 30 to 50 $m^2/g$. Examples of carbon black having CTAB within the above range include FEF. It is particularly preferable that the rubber composition of the present embodiment contains 30 to 60 parts by mass of carbon black having a CTAB adsorption specific surface area of 30 to 50 $m^2/g$ based on 100 parts by mass of the rubber component. The CATB adsorption specific surface area can be measured according to JIS K6217-3: 2001.

Further, when the combined use of soft carbon/hard carbon is not carried out, it is preferable to contain an inorganic filler. Examples of the inorganic filler include calcium carbonate, talc, hard clay, austin black, fly ash and mica. Among them, calcium carbonate and talc are preferred from the view point that they have low self-aggregation property, are less likely to cause fracture nuclei during running and have good durability, and further they have a high effect of improving extrusion processability (particularly, extrusion edge property), and calcium carbonate is more preferred.

The average particle size (average primary particle size) of the inorganic filler is preferably 1 to 100 μm, more preferably 2 to 50 μm or less. By setting the average particle size of the inorganic filler within the above range, the inorganic filler is suppressed from becoming a fracture nucleus and causing deterioration in durability. In addition, sufficient workability at the time of extrusion can be ensured. The average particle size of the inorganic filler can be measured by, for example, a laser diffraction/scattering method (microtrack method).

The content of the inorganic filler is preferably 10 to 25 parts by mass based on 100 parts by mass of the rubber component. By setting the content of the inorganic filler within the above range, it becomes possible to improve the workability without impairing the balance between E* and tan δ.

A phenol-based resin may also be contained. Specific examples of the phenol-based resin include phenol resins, modified phenol resins, cresol resins and modified cresol resins. The above-mentioned phenol resin is obtained by reacting phenol with aldehydes such as formaldehyde, acetaldehyde and furfural with an acid or alkali catalyst. The above-mentioned modified phenol resin is a phenol resin modified by, for example, cashew oil, tall oil, flaxseed oil, various types of animal and vegetable oils, unsaturated fatty acids, rosin, alkylbenzene resins or a compound such as aniline and melamine.

As the phenol-based resin, a modified phenol resin is preferable from the viewpoint that a hard composite sphere is formed by obtaining sufficient hardness by a curing reaction or a large composite sphere is formed. Cashew oil-modified phenol resin and rosin-modified phenol resin are more preferred.

The content of the phenolic resin is preferably 5 to 20 parts by mass, more preferably 10 to 20 parts by mass based on 100 parts by mass of the rubber component. By setting the total content of the phenol-based resin within the above range, sufficient hardness can be ensured, and fuel efficiency can also be ensured.

An amine-based anti-aging agent is used preferably as the anti-aging agent. The amine-based anti-aging agent is not particularly limited, and examples thereof include amine derivatives such as diphenylamine-based, p-phenylenediamine-based, naphthylamine-based and ketoneamine condensate-based derivatives. These may be used alone, or two or more types may be used in combination. Examples of the diphenylamine-based derivative include p-(p-toluenesulfonylamide)-diphenylamine, octylated diphenylamine and 4,4'-bis(α,α'-dimethylbenzyl) diphenylamine. Examples of the p-phenylenediamine-based derivative include N-(1,3-dimethylbutyl)-N'-phenyl-p-phenylenediamine (6PPD), N-phenyl-N'-isopropyl-p-phenylenediamine (IPPD) and N,N'-di-2-naphthyl-p-phenylenediamine. Examples of the naphthylamine-based derivative include phenyl-α-naphthylamine. Among them, phenylenediamine-based and ketone amine condensate-based are preferable.

Further, the amine-based anti-aging agent contained in the bead apex rubber composition and the bead reinforcing filler rubber composition may be a combination of the same or similar amine-based anti-aging agents, and may be a combination of heterogeneous or heterologous amine-based anti-aging agent.

In addition to the above components, the rubber composition may be blended with compounding materials conventionally used in the rubber industry, such as oil, stearic acid, zinc oxide, sulfur and a vulcanization accelerator, if required. The blending amount of each of the compounding materials can be appropriately selected.

Sulfur is also contained usually. The sulfur content is preferably 1 to 8 parts by mass, more preferably 2 to 6 parts by mass based on 100 parts by mass of the rubber component. By setting the sulfur content within the above range, sufficient steering stability can be ensured, sulfur bloom and stickiness can be suppressed, and durability can be ensured. The sulfur content means the pure sulfur content, and when insoluble sulfur is used, it is the content excluding the oil content.

A vulcanization accelerator is also contained usually. The content of the vulcanization accelerator is preferably 1.5 to 5.0 parts by mass, more preferably 2 to 4 parts by mass based on 100 parts by mass of the rubber component.

4. Manufacture of Tires

In the present embodiment, each of the above rubber compositions can be manufactured by kneading according to a known method, for example, by using a rubber kneading device such as an open roll or a banbury mixer.

Then, these rubber compositions are extruded according to the shape of the bead apex at the unvulcanized stage, and then bonded together with other tire members on a tire molding machine to form an unvulcanized tire. Then, the unvulcanized tire is heated and pressurized in a vulcanizer, and the tire according to the present embodiment can be manufactured.

Examples of tire categories to which this embodiment is specifically applied include tires for passenger cars. It can be also applied to heavy-duty tires for trucks and buses, tires for van light trucks, fuel-efficient tires (eco tires), run-flat tires, winter tires, and the like. And, among these tires, it is particularly preferable to apply it to a tire whose durability is required so that it can be used for a long period of time. As such tires, for example, a tire with a sound absorbing member having a sound absorbing member such as a sponge in the tire cavity, a tire with a sealing member having a sealant that can be sealed at the time of puncture inside the tire or in the tire cavity, and a tire with an electronic component having an electronic component such as a sensor and a radio tag inside the tire or inside the tire cavity can be mentioned.

EXAMPLES

Hereinafter, the present invention will be described in more detail based on Examples.

1. Preparation of Rubber Composition

First, a rubber composition for sidewalls and a rubber composition for chafer were prepared using each of the following materials.

(1) Material Used (a) Rubber Component

Natural rubber (NR): TSR20

Synthetic rubber (BR1): BR150B, cis content 96%, manufactured by Ube Kosan Co., Ltd.

Synthetic rubber (BR2): BR1250H, (Sn Coupling+end modification), cis content 40%, manufactured by Zeon Corporation Synthetic rubber (BR3): VCR617, (contains crystalline component), cis content 92%, manufactured by Ube Kosan Co., Ltd.

(b) Carbon Black

CB1: Show Black N550, DBP oil absorption 115 ml/100 g, manufactured by Cabot Japan CB2: Show Black N330T DBP oil absorption 104 ml/100 g, manufactured by Cabot Japan (c) Other Oils: Diana Process AH-24, manufactured by Idemitsu Kosan Co., Ltd.

Stearic acid: stearic acid Tsubaki, manufactured by NOF Corporation

Zinc oxide: Zinc Oxide No. 1, manufactured by Mitsui Mining & Smelting Co., Ltd.

Wax: Sunknock wax, manufactured by Ouchi Shinko Chemical Industry Co., Ltd.

Anti-aging agent 6C: Nocrack 6C manufactured by Ouchi Shinko Chemical Industry Co., Ltd.

Anti-aging agent RD: Nocrack 224 manufactured by Ouchi Shinko Chemical Industry Co., Ltd.

(d) Vulcanization Chemicals

Sulfur: Powdered sulfur, manufactured by Tsurumi Chemical Industry Co., Ltd.

Accelerator NS: Noxeller NS, manufactured by Ouchi Shinko Chemical Industry Co., Ltd.

Hybrid cross-linking agent: Vulcuren, manufactured by Lanxess, (2) Formulation (a) Rubber Composition for Sidewalls Using each of the above materials, seven types of rubber compositions for sidewalls, SW1 to SW7, were prepared with each formulation (part by mass) shown in Table 1.

(b) Rubber Composition for Chafer

Using each of the above materials, six types of rubber compositions for chafer, CA1 to CA6, were prepared with each formulation (part by mass) shown in Table 2.

TABLE 1

| Formulation | SW1 | SW2 | SW3 | SW4 | SW5 | SW6 | SW7 |
|---|---|---|---|---|---|---|---|
| NR | 40 | 40 | 40 | 40 | 40 | 40 | 40 |
| BR1 | 60 | 60 | 60 | 60 | | | |
| BR2 | | | | | 30 | 30 | 30 |
| BR3 | | | | | 30 | 30 | 30 |
| CB1 | 60 | 70 | 75 | 65 | 45 | 40 | 45 |
| Oil | 15 | 15 | 25 | 15 | 15 | 10 | 15 |
| Stearic acid | 3 | 3 | 3 | 3 | 3 | 3 | 3 |
| Zinc oxide | 4.5 | 4.5 | 4.5 | 4.5 | 4.5 | 4.5 | 4.5 |
| Wax | 2 | 2 | 2 | 2 | 2 | 2 | 2 |
| Anti-aging agent 6C | 4.5 | 4.5 | 4.5 | 4.5 | 4.5 | 4.5 | 4.5 |
| Anti-aging agent RD | 2 | 2 | 2 | 2 | 2 | 2 | 2 |
| Sulfur | 1.9 | 1.9 | 1.9 | 1.9 | 1.9 | 1.9 | 1.5 |
| Accelerator NS | 0.9 | 0.9 | 1.2 | 1.2 | 0.9 | 1.2 | 0.9 |
| Hybrid cross-linking agent | | | | | | | 0.5 |

TABLE 2

| Formulation | CA1 | CA2 | CA3 | CA4 | CA5 | CA6 |
|---|---|---|---|---|---|---|
| NR | 40 | 40 | 40 | 30 | 30 | 30 |
| BR1 | 60 | 60 | 60 | | | |
| BR2 | | | | 35 | 35 | 35 |
| BR3 | | | | 35 | 35 | 35 |
| CB1 | 75 | 65 | 70 | 55 | 50 | 40 |
| Oil | 15 | 20 | 10 | 13 | 10 | 10 |
| Stearic acid | 3 | 3 | 3 | 3 | 3 | 3 |
| Zinc oxide | 4.5 | 4.5 | 4.5 | 4.5 | 4.5 | 4.5 |
| Wax | 1.5 | 1.5 | 1.5 | 1.5 | 1.5 | 1.5 |
| Anti-aging agent 6C | 2 | 2 | 2 | 2 | 2 | 2 |
| Anti-aging agent RD | 2 | 2 | 2 | 2 | 2 | 2 |
| Sulfur | 2.8 | 2.8 | 2.8 | 2.8 | 2.8 | 2.8 |
| Accelerator NS | 3 | 3.5 | 2.5 | 3 | 3 | 3 |
| Hybrid cross-linking agent | | | | | | 0.7 |

2. Preparation of Tires

The prepared rubber compositions for sidewalls and rubber compositions for chafers were extruded into a predetermined shape to prepare sidewalls and chafers.

Separately, various tire members (tread, carcass, bead apex, bead reinforcement filler, etc.) are manufactured in the same manner as prior arts, and then an unvulcanized tire was formed using the above sidewalls and chafers and these members. The unvulcanized tire was vulcanized to produce a tire having a tire size of 205155R16 91V.

At this time, the combination of the sidewall formulation and the chafer formulation was changed as shown in Tables 3 to 5, and the structure of the bead portion was changed as shown in Tables 3 to 5. In Tables 3 to 5, the structure A of the bead portion refers to the structure shown in FIG. 1, the structure B refers to the structure shown in FIG. 2 and the structure C refers to the structure (conventional) shown in FIG. 3.

3. Evaluation (1) Viscoelasticity Test

Before evaluating each produced tire, each sample used for a viscoelasticity test was prepared by punching out, from each of the tire sidewalls and chafers, to the width of 4.2 mm in the tire radial direction, the thickness of 1 mm in the tire width direction, and the length of 30 mm in the tire circumference direction.

Then, each sample was set in a viscoelasticity test device "EPLEXOR 500" manufactured by Netchigabo Co., Ltd., and elongation-type viscoelasticity measurements were performed at 70° C. and 150° C. under the conditions of static strain of 5% and dynamic strain of ±1% to determine tan $\delta$70° C.$_{\_SW}$, tan $\delta$70° C.$_{\_C}$, E*70° C.$_{\_SW}$, E*70° C.$_{\_C}$, tan $\delta$150° C.$_{\_SW}$ and tan $\delta$150° C.$_{\_C}$. The results are shown in Tables 3 to 5.

In addition, Tables 3 to 5 show each value of the following formula calculated based on the result.

$$\tan\delta 70° \text{ C.}_{\_SW} + \tan\delta 70° \text{ C.}_{\_C}$$

$$|\tan\delta 70° \text{ C.}_{\_SW} - \tan\delta 70° \text{ C.}_{\_C}|$$

$$E^*70° \text{ C.}_{\_C} - E^*70° \text{ C.}_{\_SW}$$

$$\tan\delta 150° \text{ C.}_{\_SW} + \tan\delta 150° \text{ C.}_{\_C}$$

(2) RR Test (Evaluation of Rolling Resistance)

After mounting each tire on the rim (16×6.5 J), filling it with an air pressure of 210 kPa, and applying a load of 4.31 kN, the rolling resistance was measured after running at a speed of 80 km/h for 30 minutes, using a RR test machine of which surface is a steel drum. The evaluation was performed using an index with Comparative Example 1 as 100. The larger the index value, the better the rolling resistance. The results are shown in Tables 3 to 5.

(3) GP Test (Evaluation of Durability)

Next, after mounting each tire on the rim (16×6.5 J), under the conditions of air pressure 250 kPa, load 7.33 kN and speed 100 km/h, without replenish the air pressure, the running distance until damage occurred was measured.

The evaluation was performed using an index with Comparative Example 1 as 100. The larger the index value, the better the durability. The results are shown in Tables 3 to 5.

(4) Evaluation of Steering Stability

Each tire was mounted on a domestic 2.0 L sedan, and a sensory evaluation of steering stability was carried out by a test driver. The evaluation is performed using an index with Comparative Example 1 as 100. The larger the index value, the better the steering stability. The results are shown in Tables 3 to 5.

TABLE 3

| Examples | 1 | 2 | 3 | 4 | 5 | 6 | 7 |
|---|---|---|---|---|---|---|---|
| Rubber composition(SW) | SW4 | SW6 | SW5 | SW6 | SW7 | SW7 | SW7 |
| Rubber composition(CA) | CA2 | CA3 | CA5 | CA4 | CA5 | CA6 | CA6 |
| Structure of Bead | A | A | A | A | A | A | B |
| Viscoelasticity test results | | | | | | | |
| E * 70° C.$_{\text{-}SW}$ | 6.7 | 4.5 | 4.0 | 4.5 | 3.5 | 3.5 | 3.5 |
| E * 70 C.$_{\text{-}C}$ | 13.2 | 10.5 | 9.5 | 9.5 | 9.5 | 7.5 | 7.5 |
| tan $\delta$ 70° C.$_{\text{-}SW}$ | 0.15 | 0.07 | 0.11 | 0.07 | 0.08 | 0.08 | 0.08 |
| tan $\delta$ 70° C.$_{\text{-}C}$ | 0.09 | 0.12 | 0.07 | 0.09 | 0.07 | 0.04 | 0.04 |
| tan $\delta$ 150° C.$_{\text{-}SW}$ | 0.10 | 0.06 | 0.06 | 0.06 | 0.04 | 0.04 | 0.04 |
| tan$\delta$150° C.$_{\text{-}C}$ | 0.07 | 0.08 | 0.04 | 0.04 | 0.04 | 0.02 | 0.02 |
| Calculation results | | | | | | | |
| (tan $\delta$ 70° C.$_{\text{-}SW}$) + (tan $\delta$ 70° C.$_{\text{-}C}$) | 0.24 | 0.19 | 0.18 | 0.16 | 0.15 | 0.12 | 0.12 |
| \| (tan $\delta$ 70° C.$_{\text{-}SW}$) − (tan $\delta$ 70° C.$_{\text{-}C}$) \| | 0.06 | 0.05 | 0.04 | 0.02 | 0.01 | 0.04 | 0.04 |
| (E * 70° C.$_{\text{-}C}$) − (E * 70° C.$_{\text{-}SW}$) | 6.5 | 6.0 | 5.5 | 5.0 | 6.0 | 4.0 | 4.0 |
| (tan $\delta$ 150° C.$_{\text{-}SW}$) + (tan $\delta$ 150° C.$_{\text{-}C}$) | 0.17 | 0.14 | 0.10 | 0.10 | 0.08 | 0.06 | 0.06 |
| RR test result | 115 | 120 | 120 | 127 | 128 | 135 | 138 |
| GP test result | 117 | 123 | 128 | 132 | 135 | 132 | 134 |
| Evaluation of steering stability | 120 | 115 | 117 | 119 | 120 | 123 | 123 |

TABLE 4

| Examples | 8 | 9 | 10 | 11 | 12 | 13 | 14 | 15 |
|---|---|---|---|---|---|---|---|---|
| Rubber composition(SW) | SW3 | SW5 | SW4 | SW3 | SW5 | SW7 | SW6 | SW6 |
| Rubber composition(CA) | CA3 | CA6 | CA4 | CA4 | CA4 | CA4 | CA5 | CA6 |
| Structure of Bead | A | A | A | A | A | A | A | A |

TABLE 4-continued

| Examples | 8 | 9 | 10 | 11 | 12 | 13 | 14 | 15 |
|---|---|---|---|---|---|---|---|---|
| Viscoelasticity test results | | | | | | | | |
| E * 70° C.$_{-SW}$ | 6.5 | 4.0 | 6.7 | 6.5 | 4.0 | 3.5 | 4.5 | 4.5 |
| E * 70° C.$_{-C}$ | 10.5 | 7.5 | 9.5 | 9.5 | 9.5 | 9.5 | 9.5 | 7.5 |
| tan δ 70° C.$_{-SW}$ | 0.13 | 0.11 | 0.15 | 0.13 | 0.11 | 0.08 | 0.07 | 0.07 |
| tan δ 70° C.$_{-C}$ | 0.12 | 0.04 | 0.09 | 0.09 | 0.09 | 0.09 | 0.07 | 0.04 |
| tan δ 150° C.$_{-SW}$ | 0.11 | 0.06 | 0.10 | 0.11 | 0.06 | 0.04 | 0.06 | 0.06 |
| tan δ 150° C.$_{-C}$ | 0.08 | 0.02 | 0.04 | 0.04 | 0.04 | 0.04 | 0.04 | 0.02 |
| Calculation results | | | | | | | | |
| (tan δ 70° C.$_{-SW}$) + (tan δ 70° C.$_{-C}$) | 0.25 | 0.15 | 0.24 | 0.22 | 0.20 | 0.17 | 0.14 | 0.11 |
| \| (tan δ 70° C.$_{-SW}$) − (tan δ 70° C.$_{-C}$) \| | 0.01 | 0.07 | 0.06 | 0.04 | 0.02 | 0.01 | 0.00 | 0.03 |
| (E*70° C.$_{-C}$) − (E*70° C.$_{-SW}$) | 4.0 | 3.5 | 2.8 | 3.0 | 5.5 | 6.0 | 5.0 | 3.0 |
| (tan δ 150° C.$_{-SW}$) + (tan δ 150° C.$_{-C}$) | 0.19 | 0.08 | 0.14 | 0.15 | 0.10 | 0.08 | 0.10 | 0.08 |
| RR test result | 110 | 125 | 115 | 118 | 120 | 125 | 130 | 140 |
| GP test result | 119 | 128 | 120 | 125 | 130 | 133 | 134 | 134 |
| Evaluation of steering stability | 122 | 123 | 122 | 120 | 115 | 115 | 128 | 125 |

TABLE 5

| Comparative Examples | 1 | 2 | 3 | 4 | 5 | 6 | 7 |
|---|---|---|---|---|---|---|---|
| Rubber composition(SW) | SW1 | SW2 | SW3 | SW4 | SW5 | SW4 | SW5 |
| Rubber composition(CA) | CA1 | CA1 | CA1 | CA1 | CA1 | CA5 | CA5 |
| Structure of Bead | C | C | C | C | C | C | C |
| Viscoelasticity test results | | | | | | | |
| E * 70° C.$_{-SW}$ | 3.2 | 6.5 | 6.5 | 6.7 | 4.0 | 6.7 | 4.0 |
| E * 70° C.$_{-C}$ | 12.0 | 12.0 | 12.0 | 12.0 | 12.0 | 9.5 | 9.5 |
| tan δ 70° C.$_{-SW}$ | 0.20 | 0.22 | 0.13 | 0.15 | 0.11 | 0.15 | 0.11 |
| tan δ 70° C.$_{-C}$ | 0.12 | 0.12 | 0.12 | 0.12 | 0.12 | 0.07 | 0.07 |
| tan δ 150° C.$_{-SW}$ | 0.14 | 0.16 | 0.11 | 0.10 | 0.06 | 0.10 | 0.06 |
| tan δ 150° C.$_{-C}$ | 0.10 | 0.10 | 0.10 | 0.10 | 0.10 | 0.04 | 0.04 |
| Calculation results | | | | | | | |
| (tan δ 70° C.$_{-SW}$) + (tan δ 70° C.$_{-C}$) | 0.32 | 0.34 | 0.25 | 0.27 | 0.23 | 0.22 | 0.18 |
| \| (tan δ 70° C.$_{-SW}$) − (tan δ 70° C.$_{-C}$) \| | 0.08 | 0.10 | 0.01 | 0.03 | 0.01 | 0.08 | 0.04 |
| (E * 70° C.$_{-C}$) − (E * 70° C.$_{-SW}$) | 8.8 | 5.5 | 5.5 | 5.3 | 8.0 | 2.8 | 5.5 |
| (tan δ 150° C.$_{-SW}$) + (tan δ 150° C.$_{-C}$) | 0.24 | 0.26 | 0.21 | 0.20 | 0.16 | 0.14 | 0.10 |
| RR test result | 100 | 80 | 105 | 110 | 105 | 106 | 109 |
| GP test result | 100 | 85 | 100 | 105 | 103 | 101 | 110 |
| Evaluation of steering stability | 100 | 95 | 105 | 102 | 92 | 92 | 98 |

From Tables 3 and 4, it can be seen that in Examples 1 to 15, that is, when the respective conditions specified in claim 1 are satisfied, the rolling resistance, durability performance and steering stability are excellent. Further, it can be seen that, in Examples 2 to 15 satisfying the respective conditions specified in claims 2 to 8, the rolling resistance, durability performance and steering stability become more excellent than those in Example 1.

On the other hand, it can be seen that, in the cases of Comparative Examples 1 to 6, rolling resistance, durability and steering stability are not sufficiently excellent, since the conventional bead structure C is used, and the calculation results based on the viscoelasticity test result do not satisfy all of the conditions specified in claim 1. Further, it can be seen that, even in Comparative Example 7 in which the calculation results based on the viscoelasticity test result satisfy all of the conditions specified in claim 1, no remarkable effect is obtained Although the present invention has been described above based on the embodiments, the present invention is not limited to the above embodiments. Various modifications can be made to the above embodiments within the same and equivalent scope as the present invention.

DESCRIPTION OF THE REFERENCE NUMERALS

2 Bead part
3 Side wall part
21 Bead core
22 Bead apex
23 Bead reinforcement filler
24 Chafer
31 Side wall
32 Carcasply

What is claimed is:

1. A pneumatic tire having a bead apex, a bead reinforcing filler, a sidewall and a chafer in the bead portion, or having a bead apex, a sidewall and a chafer in the bead portion, in which the outer end of the chafer in the tire radial direction is located on the tire surface, and, wherein:

when the loss tangents of the sidewall and the chafer measured under the conditions of 70° C., 1% elongation and frequency of 10 Hz are set to $\tan \delta 70^\circ\ C._{\_SW}$ and $\tan \delta 70^\circ\ C._{\_C}$, respectively, the complex elastic moduli of the sidewall and the chafer measured under the same conditions are set to $E^*70^\circ\ C._{\_SW}$ (MPa) and $E^*70^\circ\ C._{\_C}$ (MPa), respectively, and the loss tangents of the sidewall and the chafer measured under the conditions of 150° C., 1% elongation and frequency of 10 Hz are set to $\tan \delta 150^\circ\ C._{\_SW}$ and $\tan \delta 150^\circ\ C._{\_C}$, respectively, the following formulas are satisfied:

$$\tan \delta 70^\circ\ C._{\_SW} + \tan \delta 70^\circ\ C._{\_C} \leq 0.12$$

$$|\tan \delta 70^\circ\ C._{\_SW} - \tan \delta 70^\circ\ C._{\_C}| \leq 0.07$$

$$E^*70^\circ\ C._{\_C} - E^*70^\circ\ C._{\_SW} \leq 6.5\ \mathrm{MPa}$$

$$\tan \delta 150^\circ\ C._{\_SW} + \tan \delta 150^\circ\ C._{\_C} \leq 0.10.$$

2. The pneumatic tire according to claim 1, wherein the sidewall and the chafer satisfy the following formulas:

$$|\tan \delta 70^\circ\ C._{\_SW} - \tan \delta 70^\circ\ C._{\_C}| \leq 0.05$$

$$E^*70^\circ\ C._{\_C} - E^*70^\circ\ C._{\_SW} \leq 6.0\ \mathrm{MPa}.$$

3. The pneumatic tire according to claim 2, wherein the sidewall and the chafer satisfy the following formulas:

$$|\tan \delta 70^\circ\ C._{\_SW} - \tan \delta 70^\circ\ C._{\_C}| \leq 0.04$$

$$E^*70^\circ\ C._{\_C} - E^*70^\circ\ C._{\_SW} \leq 5.5\ \mathrm{MPa}.$$

4. The pneumatic tire according to claim 3, wherein the sidewall and the chafer satisfy the following formulas:

$$|\tan \delta 70^\circ\ C._{\_SW} - \tan \delta 70^\circ\ C._{\_C}| \leq 0.03$$

$$E^*70^\circ\ C._{\_C} E^*70^\circ\ C._{\_SW} \leq 5.0\ \mathrm{MPa}.$$

5. The pneumatic tire according to claim 1, wherein the sidewall and the chafer satisfy the following formula:

$$|\tan \delta 70^\circ\ C._{\_SW} - \tan \delta 70^\circ\ C._{\_C}| \leq 0.06.$$

6. The pneumatic tire according to claim 1, wherein the sidewall and the chafer satisfy the following formula:

$$E^*70^\circ\ C._{\_C} - E^*70^\circ\ C._{\_SW} \leq 4.0\ \mathrm{MPa}.$$

7. The pneumatic tire according to claim 1, wherein the tire is a passenger car tire.

8. The pneumatic tire according to claim 1, which is at least one selected from the group consisting of a tire with a sound absorbing member, a tire with a sealing member, and a tire with an electronic component.

9. A pneumatic tire having a bead apex, a bead reinforcing filler, a sidewall and a chafer in the bead portion, or having a bead apex, a sidewall and a chafer in the bead portion, in which the outer end of the chafer in the tire radial direction is located on the tire surface, and, wherein:

when the loss tangents of the sidewall and the chafer measured under the conditions of 70° C., 1% elongation and frequency of 10 Hz are set to $\tan \delta 70^\circ\ C._{\_SW}$ and $\tan \delta 70^\circ\ C._{\_C}$, respectively, the complex elastic moduli of the sidewall and the chafer measured under the same conditions are set to $E^*70^\circ\ C._{\_SW}$ (MPa) and $E^*70^\circ\ C._{\_C}$ (MPa), respectively, and the loss tangents of the sidewall and the chafer measured under the conditions of 150° C., 1% elongation and frequency of 10 Hz are set to $\tan \delta 150^\circ\ C._{\_SW}$ and $\tan \delta 150^\circ\ C._{\_C}$, respectively, the following formulas are satisfied:

$$\tan \delta 70^\circ\ C._{\_SW} + \tan \delta 70^\circ\ C._{\_C} \leq 0.25$$

$$\tan \delta 70^\circ\ C._{\_SW} - \tan \delta 70^\circ\ C._{\_C}| \leq 0.07$$

$$E^*70^\circ\ C._{\_C} - E^*70^\circ\ C._{\_SW} \leq 4.0\ \mathrm{MPa}$$

$$\tan \delta 150^\circ\ C._{\_SW} + \tan \delta 150^\circ\ C._{\_C} \leq 0.10,$$

wherein a rubber composition for the sidewall and the chafer includes a natural rubber and a butadiene rubber, and the natural rubber is 20% by mass or more and 70% by mass or less, and the butadiene rubber is 20% by mass or more, and 85% by mass or less.

* * * * *